(12) United States Patent
Islam et al.

(10) Patent No.: US 7,949,377 B2
(45) Date of Patent: May 24, 2011

(54) METHOD AND APPARATUS FOR USER EQUIPMENT DIRECTED RADIO RESOURCE CONTROL IN A UMTS NETWORK

(75) Inventors: Muhammad Khaledul Islam, Kanata (CA); Jeffery Wirtanen, Kanata (CA)

(73) Assignee: Research In Motion Limited, Waterloo, Ontario (CA)

( * ) Notice: Subject to any disclaimer, the term of this patent is extended or adjusted under 35 U.S.C. 154(b) by 671 days.

(21) Appl. No.: 11/302,263

(22) Filed: Dec. 14, 2005

(65) Prior Publication Data

US 2007/0135080 A1 Jun. 14, 2007

(51) Int. Cl.
*H04B 1/00* (2006.01)
(52) U.S. Cl. .................... 455/574; 455/154.1
(58) Field of Classification Search ............ 455/574, 455/410, 411, 458, 41.2, 524, 127.5
See application file for complete search history.

(56) References Cited

U.S. PATENT DOCUMENTS

| | | | |
|---|---|---|---|
| 5,812,636 A | 9/1998 | Tseng et al. | |
| 6,064,340 A | 5/2000 | Croft et al. | |
| 6,229,989 B1 * | 5/2001 | Kwon | 340/7.33 |
| 6,243,579 B1 | 6/2001 | Kari | |
| 6,377,790 B1 | 4/2002 | Ishii | |
| 6,654,360 B1 | 11/2003 | Abrol | |
| 6,657,984 B1 | 12/2003 | Semper | |
| 6,661,777 B1 | 12/2003 | Blanc et al. | |
| 6,668,175 B1 | 12/2003 | Almgren et al. | |
| 6,845,236 B2 | 1/2005 | Chang | |
| 6,847,610 B1 | 1/2005 | Suumaki et al. | |
| 6,961,570 B2 | 11/2005 | Kuo et al. | |
| 7,130,668 B2 * | 10/2006 | Chang et al. | 455/574 |
| 7,155,261 B2 | 12/2006 | Chen | |
| 7,353,120 B2 | 4/2008 | Enta | |
| 2001/0018342 A1 | 8/2001 | Vialen et al. | |
| 2002/0077105 A1 | 6/2002 | Chang | |
| 2002/0082020 A1 | 6/2002 | Lee et al. | |
| 2002/0141331 A1 | 10/2002 | Mate et al. | |
| 2003/0003895 A1 * | 1/2003 | Wallentin et al. | 455/410 |
| 2003/0014145 A1 | 1/2003 | Reiss et al. | |
| 2003/0157927 A1 | 8/2003 | Yi et al. | |

(Continued)

FOREIGN PATENT DOCUMENTS

EP 0695069 1/1996

(Continued)

OTHER PUBLICATIONS

"Digital Cellular Telecommunications System (Phase 2+)"; ETSI Standards European Telecommunications Standards Institute, Sophia-Antipo, FR, vol. 3-SA2, No. V6110, Dec. 2005, XP014032437.

(Continued)

*Primary Examiner* — Tu X Nguyen
(74) *Attorney, Agent, or Firm* — Finnegan, Henderson, Farabow, Garrett & Dunner LLP

(57) ABSTRACT

A method and apparatus for improved battery performance of user equipment in a wireless network having multiple radio resource control (RRC) states, the method comprising the steps of: monitoring, at the user equipment, application data exchange; determining when no application on the user equipment is expected to exchange data; and initiating, from the user equipment, a transition to a less battery demanding radio resource control state or mode.

25 Claims, 8 Drawing Sheets

U.S. PATENT DOCUMENTS

| | | | |
|---|---|---|---|
| 2003/0211846 | A1 | 11/2003 | Nagpal et al. |
| 2004/0120253 | A1 | 6/2004 | Forssell et al. |
| 2004/0179490 | A1 | 9/2004 | Jang et al. |
| 2004/0203778 | A1 | 10/2004 | Kuo et al. |
| 2004/0224688 | A1 | 11/2004 | Fischer |
| 2005/0026597 | A1 | 2/2005 | Kim et al. |
| 2005/0141471 | A1 | 6/2005 | Virtanen et al. |
| 2005/0143056 | A1 | 6/2005 | Iyer et al. |
| 2005/0153700 | A1 | 7/2005 | Farnsworth et al. |
| 2005/0185613 | A1 | 8/2005 | Kowalski et al. |
| 2005/0237935 | A1 | 10/2005 | Chae et al. |
| 2005/0266846 | A1 | 12/2005 | Kim |
| 2005/0281269 | A1 | 12/2005 | Choi |
| 2006/0036741 | A1 | 2/2006 | Kiss et al. |
| 2006/0089137 | A1 | 4/2006 | Howell et al. |
| 2006/0094478 | A1 | 5/2006 | Kim et al. |
| 2006/0109846 | A1 | 5/2006 | Lioy et al. |
| 2006/0176167 | A1 | 8/2006 | Dohrmann |
| 2006/0182022 | A1 | 8/2006 | Abedi |
| 2006/0223537 | A1 | 10/2006 | Kojima |
| 2006/0240823 | A1 | 10/2006 | Jiao et al. |
| 2006/0293067 | A1* | 12/2006 | Leung et al. ............... 455/458 |
| 2007/0135080 | A1 | 6/2007 | Islam et al. |
| 2007/0270140 | A1 | 11/2007 | Islam et al. |
| 2008/0039087 | A1 | 2/2008 | Gallagher et al. |
| 2008/0049662 | A1 | 2/2008 | Islam et al. |
| 2008/0123658 | A1 | 5/2008 | Hyytia et al. |
| 2008/0126554 | A1 | 5/2008 | Sakai et al. |
| 2008/0212542 | A1 | 9/2008 | Kung et al. |
| 2008/0253312 | A1 | 10/2008 | Park |
| 2008/0304510 | A1 | 12/2008 | Qu |
| 2009/0042560 | A1 | 2/2009 | Islam et al. |
| 2009/0124212 | A1 | 5/2009 | Islam et al. |
| 2009/0124249 | A1 | 5/2009 | Young et al. |
| 2009/0129339 | A1 | 5/2009 | Young et al. |
| 2010/0118752 | A1 | 5/2010 | Suzuki et al. |

FOREIGN PATENT DOCUMENTS

| | | |
|---|---|---|
| EP | 1453286 A1 | 1/2004 |
| EP | 1511337 | 3/2005 |
| EP | 1596616 A1 | 11/2005 |
| EP | 1608113 A1 | 12/2005 |
| EP | 1798998 A1 | 6/2007 |
| EP | 1858209 A1 | 11/2007 |
| EP | 1892895 A1 | 2/2008 |
| EP | 1981224 | 10/2008 |
| EP | 2061192 | 5/2009 |
| EP | 2244499 | 10/2010 |
| EP | 2271168 | 1/2011 |
| JP | 09-055764 | 2/1997 |
| JP | 2000-261372 | 9/2000 |
| WO | WO 00/062435 | 10/2000 |
| WO | WO 00/062449 | 10/2000 |
| WO | 01/52574 A1 | 7/2001 |
| WO | WO 02/33853 | 4/2002 |
| WO | WO 2004/032391 | 4/2004 |
| WO | WO 2004/056142 | 7/2004 |
| WO | 2004/1079542 A2 | 9/2004 |
| WO | 2005029813 | 3/2005 |
| WO | 2005050917 | 6/2005 |
| WO | WO 2005/064962 | 7/2005 |
| WO | WO 2005/120104 | 12/2005 |
| WO | WO 2007/073118 | 6/2007 |
| WO | WO 2007/097670 | 8/2007 |
| WO | 2009062302 | 5/2009 |
| WO | 2009104086 | 8/2009 |

OTHER PUBLICATIONS

3rd Generation Partnership Project 2 "3GPP2", "Upper Layer (Layer 3) Signaling Standard for cdma2000 Spread Spectrum Systems, Release 0, 3GPP2 C.S0005-0, version 3.0, Jun. 15, 2000.

3rd Generation Partnership Project 2 "3GPP2", "Data Service Options for Spread Spectrum Systems: Service Options 33 and 66", 3GPP2 C.S0017-012-A, version 1.0, Jun. 11, 2004.

PCT/CA2008/002001 International Search Report and Written Opinion dated Feb. 2, 2009.

PCT/CA2008/002000 International Search Report and Written Opinion dated Feb. 13, 2009.

PCT/CA2008/002002 International Search Report and Written Opinion dated Jan. 15, 2009.

International Application No. PCT/US2009/063912, Communication Relating to the Results of the Partial International Search dated Feb 17, 2010.

Research In Motion Limited: "Fast dormancy alternatives", 3GPP Draft; R2-083626, 3$^{rd}$ Generation Partnership Project (3GPP) TSG-RAN WG2 Meeting #62bis, Warsaw, Poland, Jun. 30-Jul 4, 2008.

Nokia Corporatio et al.: "Fast Dormancy: A way forward", 3GPP Draft; R2-084647, 3$^{rd}$ Generation Partnership Project (3GPP) TSG-RAN WG2 Meeting #63, Jeju, South Korea, 18$^{th}$-22$^{nd}$ Aug. 2008.

EP Application No. 08154976.8, Communication pursuant to Article 94(3) EPC, dated Oct. 8, 2009.

Extended European Search Report for Application No. 08154976.8, dated Sep. 3, 2008.

3GPP: "Radio resource control (RRC) protocol specification V7.0.0," 3GPP TS 25.331 V7.0.0, (1,249 pgs.).

3GPP Radio Resource Control Protocal for the UE-UTRAN Radio Interface, 3GPP TS 25.331 V6.8.0 (Dec. 2005) (1,174 pgs.).

Chairman: Title LTE CP Session Report; 3GPP TSG RAN WG2 #63bis; R2-085921; Prague, Czech Republic; Sep. 29-Oct. 3, 2008 (38 pgs.).

Qualcomm Europe; Title: Introduction of Signaling Connection Release Indication; 3GPP TSG-RAN WG2 meeting #63bis; R2-085584; Prague, Czech Republic; Sep. 29-Oct. 3, 2008 (5 pgs.).

Research In Motion Limited, AT&T; Title: Fast Dormancy; A way forward; 3GPP TSG-RAN2 Meeting #63bis; R2-085134; Prague, Czech Republic; Sep. 29-Oct. 3, 2008 (13 pgs.).

Vodafone, Rim; Huawei; Title: UE "Fast Dormancy" Behaviour; 3GPP TSG-RAN WG2 Meeting #60; R2-074848; Nov. 5-9, 2007, Jeju, South Korea (9 pgs.).

"3$^{rd}$ Generation Partnership Project; Technical Specification Group Radio Access Network; Evolved Universal Terrestrial Radio Access (E-UTRA) and Evolved Universal Terrestrial Radio Access Network (E-URTRA); Overall description; Stage 2 (Release 8)," 3GPP TS 36.300 V8.9.0 (Jun. 2009) (159 pgs.).

"3$^{rd}$ Generation Partnership Project; Technical Specification Group Services and System Aspects; General Packet Radio Service (GPRS) enhancements for Evolved Universal terrestrial Radio Access Network (E-UTRAN) access (Release 8)," 3GPP TS 23.401 V8.7.0 (Sep. 2009) (234 pgs.).

"3$^{rd}$ Generation Partnership Project; Technical Specification Group Radio Access Network; Evolved Universal Terrestrial Radio Access (E-UTRA) Medium Access Control (MAC) protocol specification (Release 8)," 3GPP TS 36.321 V8.7.0 (Sep. 2009) (47 pgs.).

"3$^{rd}$ Generation Partnership Project; Technical Specification Group Radio Access Network; Evolved Universal Terrestrial Radio Access (E-UTRA); User Equipment (UE) procedures in idle mode (Release 8)," 3GPP TS 36.304 V8.6.0 (Jun. 2009) (30 pgs.).

"3$^{rd}$ Generation Partnership Project; Technical Specification Group Radio Access Network; Evolved Universal Terrestrial Radio Access (E-UTRA) Radio Resource Control (RRC); Protocol specification (Release 8)," 3GPP TS 36.331 V8.6.0 (Jun. 2009) (207 pgs.).

"3$^{rd}$ Generation Partnership Project; Technical Specification Group Services and System Aspects; Policy and charging control architecture (Release 8)," 3GPP TS 23.203 V8.7.0 (Sep. 2009) (114 pgs.).

"3$^{rd}$ Generation Partnership Project 2; Data Service Options for Spread Spectrum Systems," 3GPP2 C.S0017-0, Version 5.0, Feb. 17, 2003 (70 pgs.).

"3$^{rd}$ Generation Partnership Project 2; Data Service Options for Spread Spectrum Systems: Introduction and Service Guide," 3GPP2 C.S0017-001-A, Version 1.0, Jun. 11, 2004 (22 pgs.).

"3$^{rd}$ Generation Partnership Project 2; Upper Layer (Layer 3) Signaling Standard for cdma2000 Spread Spectrum Systems Release D," 3GPP2 C.S0005-D, Version 1.0, Feb. 2004 (2247 pgs.).

"3$^{rd}$ Generation Partnership Project 2; Upper Layer (Layer 3) Signaling Standard for cdma2000 Spread Spectrum Systems Release D," 3GPP2 C.S0005-D, Version 2.0, Sep. 6, 2005 (2367 pgs.).

Vodafone, Rim; Huawei; Title: UE "Fast Dormancy" Behaviour; 3GPP TSG-RAN WG2 Meeting #60; R2-075251; Nov. 5-9, 2007, Jeju, South Korea (12 pgs.).

"3rd Generation Partnership Project 2; Data Service Options for Spread Spectrum Systems: Service Options 33 and 66," 3GPP2 C.S0017-012-A, Version 2.0, May, 2006 (70 pgs.).
"3rd Generation Partnership Project 2; Data Service Options for Spread Spectrum Systems: Radio Link Protocol Type 3," 3GPP2 C.S0017-010-A, Version 2.0, Sep. 2005 (56 pgs.).
"3rd Generation Partnership Project 2; Data Service Options for Spread Spectrum Systems: Service Options 33 and 66," 3GPP2 C.S0017-012-A, Version 1.0, Jun. 11, 2004 (70 pgs.).
3GPP TS 25.331 V5.16.0 (Mar. 2006) (1045 pgs.).
"3rd Generation Partnership Project; Technical Specification Group Services and System Aspects; Policy and charging control architecture (Release 8)," 3GPP TS 23.203 V8.1.1 (Mar. 2008) (87 pgs.).
"3rd Generation Partnership Project; Technical Specification Group Radio Access Network; User Equipment (UE) procedures in idle mode and procedures for cell reselection in connected mode (Release 7)," 3GPP TS 25.304 V7.1.0 (Dec. 2006) (38 pgs.).
"3rd Generation partnership Project; Technical Specification Group Services and System Aspects; General Packet Radio Service (GPRS) enhancements for Evolved Universal Terrestrial Radio Access Network (E-UTRAN) access (Release 8)," 3GPP TS 23.401 V8.0.0 (Dec. 2007) (167 pgs.).
SDO Review Comment Form, SP-3-4617, 12-UGR (TIA-707-B.12) C.P0017.12-A (5 pgs.).
EP Communication for EP Application No. 05112183.8, dated Sep. 7, 2009 (3 pgs.).
EP Communication for EP Application No. 05112183.8, dated Jan. 24, 2008 (2 pgs.).
EP Search Report for EP Application No. 05112183.8, dated May 3, 2007 (7 pgs.).
JP Office Action for JP Application No. 2007-131146, dated Sep. 30, 2010 (7 pgs.).
Extended European Search Report for EP 09180936.8, dated May 20, 2010 (9 pgs.).
U.S. Appl. No. 12/844,302, filed Jul. 27, 2010 (35 pgs.).
Australian First Report for AU Application No. 2006252042, dated Apr. 9, 2008, (this reference relates to U.S. Appl. No. 11/302,263) (2 pgs.).
Extended European Search Report for EP Application No. 07121138.7, dated May 16, 2008 (this reference relates to U.S. Appl. No. 11/464,380) (10 pgs.).
Canadian Office Action for CA Application 2,571,101, dated Mar. 16, 2010, (this reference relates to U.S. Appl. No. 11/302,263) (4 pgs.).
Extended European Search Report for EP Application No. 10184515, dated Nov. 19, 2010, (this reference relates to U.S. Appl. No. 11/464,380) (7 pages).
Australian First Report for AU Application No. 2007202206, dated Sep. 2, 2008, (this reference relates to U.S. Appl. No. 11/464,380) (7 pgs.).
Australian Second Report for AU Application No. 2007202206, dated Sep. 30, 2009, (this reference relates to U.S. Appl. No. 11/464,380) (1 pg.).
Korean Notice Requesting Submission of Opinion for Korean Application No. 10-2006-0128027 (including translation), dated Nov. 26, 2007 (this reference relates to U.S. Appl. 11/302,263) (8 pgs.).
Korean Notice Requesting Submission of Opinion for Korean Application No. 10-2006-0128027 (including translation), dated Aug. 28, 2008 (this reference relates to U.S. Appl. No. 11/302,263) (4pgs.).
Chinese First Office Action for Chinese Application No. 200610064329.X, dated Feb. 6, 2009, (including translation) (this reference relates to U.S. Appl. No. 11/302,263) (18 pgs.).
Chinese Second Office Action for Chinese Application No. 200610064329.X, dated Feb. 24, 2010, (including translation) (this reference relates to U.S. Appl. No. 11/302,263) (18 pgs.).
Japanese Office Action for JP Application No. 2006-335943, dated Jun. 19, 2009 (including translation), (this reference relates to U.S. Appl. No. 11/302,263) (10 pgs.).
Japanese Final Office Action for JP Application No. 2006-335943, dated Dec. 3, 2009 (including translation), (this reference relates to U.S. Appl. No. 11/302,263) (6 pgs.).
European Search Report for EP Application No. 06118909.8, dated Jul. 30, 2009 (this reference relates to U.S. Appl. No. 11/464,380) (3 pgs.).
Communication from the EP Patent Office for EP Application No. 06118909.8, dated Jun. 25, 2008 (this reference relates to U.S. Appl. No. 11/464,380) (3 pgs.).
Communication from the EP Patent Office for EP Application No. 06118909.8, dated Nov. 12, 2007 (this reference relates to U.S. Appl. No. 11/464,380) (4 pgs.).
Extended European Search Report for EP Application No. 06118909.8, dated Nov. 24, 2006 (this reference relates to U.S. Appl. No. 11/464,380) (8 pgs.).
Extended European Search Report for EP 10170815.4 dated Nov. 2, 2010.
Office Action for U.S. Appl. No. 12/270,562 dated Nov. 18, 2010.
Office Action for U.S. Appl. No. 11/464,380 dated Dec. 22, 2010.
Office Action for. U.S. Appl. No. 12/196,018 dated Jan. 5, 2011.
PCT Search Report for Application No. PCT/US2009/063912 dated Feb. 17, 2010.
EP Search Report for EP Application 10183886.0 dated Nov. 15, 2010.
PCT Written Opinion and Search Report for PCT/US2009/063912 dated Apr. 13, 2010.
EP Extended Search Report for EP Application 06119590.5 dated Mar. 20, 2007.
EP Search Report for EP Application 06119590.5 dated Oct. 25, 2007.
PCT Search Report for PCT/CA2007/001497 dated Dec. 18, 2008.
PCT Written Opinion for PCT/CA2007/001497 dated Dec. 12, 2007.
EP Communication for EP Application 07121138.7 dated Oct. 19, 2010.
EP Extended Search Report for EP Application 10184515.4 dated Nov. 19, 2010.
Extended European Search Report for EP Application No. 08154976.8 dated Sep. 3, 2008.
PCT International Search Report for Application PCT/US2009/063912 dated May 3, 2010 (6 pages).
PCT Written Opinion for PCT Application PCT/US2009/063912 dated May 3, 2010 (22 page).
EP Examination Report for EP Application No. 07121138.7-2412 dated Sep. 7, 2009 (1 page).
Extended European Search Report for EP Application No. 08849731.8 dated Jan. 18, 2011 (7 pages).
Extended European Search Report for EP Application No. 08849315.0 dated Jan. 18, 2011 (8 pages).
PCT Search Report and Written Opinion for PCT Application No. PCT/EP2010/064859 dated Feb. 9, 2011 (17 pages).
PCT Search Report and Written Opinion for PCT Application No. PCT/EP2010/068065 dated Feb. 11, 2011 (17 pages).
3GPP TSG-RAN2 Meeting #67; R2-094792; Shenzhen, China, Aug. 24-28, 2009 (10 pages).
3GPP TSG-RAN WG2#67bis; R2-096027; Miyazaki, Japan, Oct. 12-16, 2009 (4 pages).
3GPP TSG-RAN WG2#68; R2096624; Jeju, South Korea, Nov. 9-13, 2009 (8 pages).
3GPP TSG-RAN2 Meeting #69; r2101440; San Francisco, CA, Feb. 22-26, 2010 (18 pages).
3GPP TSG-RAN2 Meeting #69; R2101441; San Francisco, CA, Feb. 22-26, 2010 (20 pages).
3GPP TSG-RAN WG2 Meeting #69; R2101726; San Francisco, CA, Feb. 22-26, 2010 (6 pages).
Canadian Office Action for Canadian Application 2,589,373 dated Feb. 22, 2011 (5 pages).
U.S. Appl. No. 12/649,461 filed Dec. 3, 2009 (87 pages).

* cited by examiner

METHOD AND APPARATUS FOR USER EQUIPMENT DIRECTED RADIO RESOURCE CONTROL IN A UMTS NETWORK

FIELD OF THE APPLICATION

The present application relates to radio resource control between User Equipment (UE) and Universal Terrestrial Radio Access Network (UTRAN), and in particular to the transitioning between modes and states in a UMTS network.

BACKGROUND

A Universal Mobile Telecommunication System (UMTS) is a broadband, packet-based system for the transmission of text, digitized voice, video and multi-media. It is a highly subscribed to standard for third generation and is generally based on Wideband Coded Division Multiple Access (W-CDMA).

In a UMTS network, a Radio Resource Control (RRC) part of the protocol stack is responsible for the assignment, configuration and release of radio resources between the UE and the UTRAN. This RRC protocol is described in detail in the 3GPP TS 25.331 specifications. Two basic modes that the UE can be in are defined as "idle mode" and "UTRA connected mode". UTRA stands for UMTS Terrestrial Radio Access. In idle mode, the UE is required to request an RRC connection whenever it wants to send any user data or in response to a page whenever the UTRAN or the Serving GPRS Support Node (SGSN) pages it to receive data from an external data network such as a push server. Idle and Connected mode behaviors are described in detail in 3GPP specifications TS 25.304 and TS 25.331.

When in a UTRA RRC connected mode, the device can be in one of four states. These are:

CELL_DCH: A dedicated channel is allocated to the UE in uplink and downlink in this state to exchange data. The UE must perform actions as outlined in 3GPP 25.331.

CELL_FACH: no dedicated channel is allocated to the user equipment in this state. Instead, common channels are used to exchange a small amount of bursty data. The UE must perform actions as outlined in 3GPP 25.331 which includes the cell selection process as defined in 3GPP TS 25.304.

CELL_PCH: the UE uses Discontinuous Reception (DRX) to monitor broadcast messages and pages via a Paging Indicator Channel (PICH). No uplink activity. is possible. The UE must perform actions as outlined in 3GPP 25.331 which includes the cell selection process as defined in 3GPP TS 25.304. The UE must perform the CELL UPDATE procedure after cell reselection.

URA_PCH: the UE uses Discontinuous Reception (DRX) to monitor broadcast messages and pages via a Paging Indicator Channel (PICH). No uplink activity is possible. The UE must perform actions as outlined in 3GPP 25.331 including the cell selection process as defined in 3GPP TS 25.304. This state is similar to CELL_PCH, except that the URA UPDATE procedure is only triggered via UTRAN Registration Area (URA) reselection.

The transition from an idle to the connected mode and vise-versa is controlled by the UTRAN. When an idle mode UE requests an RRC connection, the network decides whether to move the UE to the CELL_DCH or CELL_FACH state. When the UE is in an RRC connected mode, again it is the network that decides when to release the RRC connection. The network may also move the UE from one RRC state to another prior to releasing the connection. The state transitions are typically triggered by data activity or inactivity between the UE and the network. Since the network may not know when the UE has completed data exchange, it typically keeps the RRC connection for some time in anticipation of more data to/from the UE. This is typically done to reduce the latency of call setup and radio bearer setup. The RRC connection release message can only be sent by the UTRAN. This message releases the signal link connection and all radio bearers between the UE and the UTRAN.

The problem with the above is that even if an application on the UE has completed its data transaction and is not expecting any further data exchange, it still waits for the network to move it to the correct state. The network may not be even aware of the fact that the application on the UE has completed its data exchange. For example, an application on the UE may use its own acknowledgement-based protocol to exchange data with its application server which is connected to the UMTS core network. Examples are applications that run over UDP/IP implementing-their own guaranteed delivery. In such a case, the UE knows whether the application server has sent or received all the data packets or not and is in a better position to determine if any further data exchange is to take place and hence decide when to terminate the RRC connection. Since the UTRAN controls when the RRC connected state is changed to a different, less battery-intensive state or into an idle mode, and the fact that UTRAN is not aware of the status of data delivery between the UE and external server, the UE is forced to stay in a higher data rate and intensive battery state than the required state or mode, thereby draining battery life and wasting network resources.

BRIEF DESCRIPTION OF THE DRAWINGS

The present application will be better understood with reference to the drawings in which.

DETAILED DESCRIPTION

Figure 1:
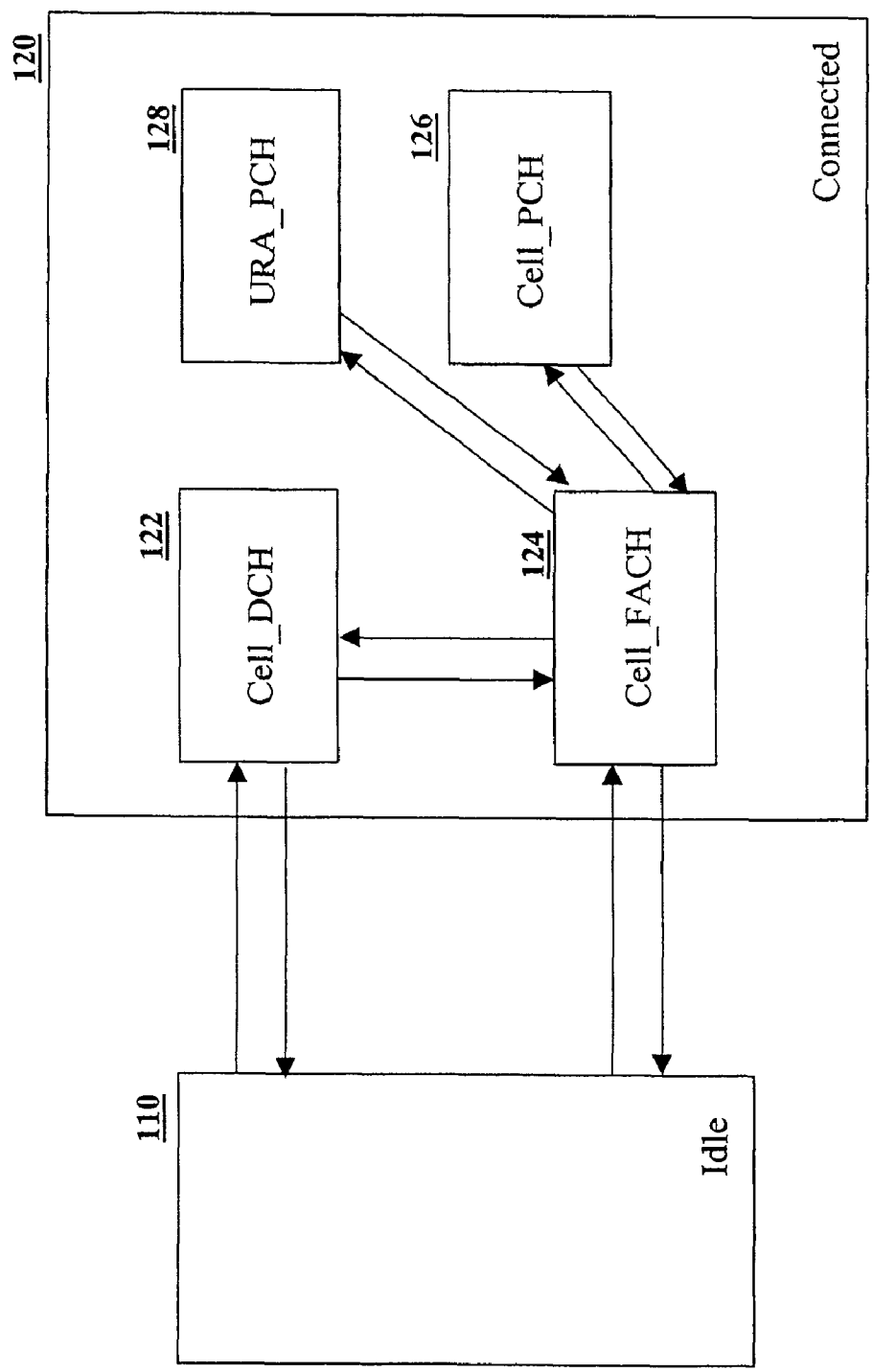
FIG. 1 is a block diagram showing RRC states and transitions.

The present system and method overcome the deficiencies of the prior art by providing for the transitioning from an RRC connected mode to a more battery-efficient state or mode. In particular, the present method and apparatus provide for transitioning based on either the UE initiating termination of a signaling connection for a specified core network domain or indicating to the UTRAN that a transition should occur from one connected state to another.

In particular, if an application on the UE determines that it is done with the exchange of data, it can send a "done" indication to the "RRC connection manager" component of the UE software. The RRC connection manager keeps track of all existing applications (including those providing a service over one or multiple protocols), associated Packet Data Protocol (PDP) contexts, associated packet switched (PS) radio bearers and associated circuit switched (CS) radio bearers. A PDP Context is a logical association between a UE and PDN (Public Data Network) running across a UMTS core network. One or multiple applications (e.g. an e-mail application and a browser application) on the UE may be associated with one PDP context. In some cases, one application on the UE is associated with one primary PDP context and multiple applications may be tied with secondary PDP contexts. The RRC Connection Manager receives "done" indications from different applications on the UE that are simultaneously active. For example, a user may receive an e-mail from a push server while browsing the web. After the e-mail application has sent an acknowledgment, it may indicate that it has completed its data transaction; however, the browser application may not send such indication. Based on a composite status of such indications from active applications, the UE software can decide how long it should wait before it can initiate a signaling connection release of the core network packet service domain. A delay in this case can be introduced to ensure that the application is truly finished with data exchange and does not require an RRC connection. The delay can be dynamic based on traffic history and/or application profiles. Whenever the RRC connection manager determines that with some probability that no application is expected to exchange any data, it can send a signaling connection release indication procedure for the appropriate domain (e.g. PS domain). Alternatively it can send a request for state transition within connected mode to the UTRAN.

The above decision may also take into account whether the network supports the URA_PCH state and the transition behaviour to this state.

The UE-initiated transition to idle mode can happen from any state of the RRC connected mode and ends up having the network release the RRC connection and moving to idle mode. The UE being in idle mode, as will be appreciated by those skilled in the art, is much less battery intensive than the UE being in a connected state.

The present application therefore provides a method for improved battery performance of user equipment in a wireless network having multiple radio resource control (RRC) states, comprising the steps of: monitoring, at the user equipment, application data exchange; determining when no application on the user equipment is expected to exchange data; and initiating, from the user equipment, a transition to a less battery-demanding radio resource control state or mode.

The present application further provides user equipment adapted for reduced battery consumption in a UMTS network, the user equipment having a radio subsystem including a radio adapted to communicate with the UMTS network; a radio processor having a digital signal processor and adapted to interact with said radio subsystem; memory; a user interface; a processor adapted to run user applications and interact with the memory, the radio, and the user interface, and adapted to run applications, the user equipment characterized by having means for: monitoring, at the user equipment, application data exchange; determining when no application on the user equipment is expected to exchange data; and initiating, from the user equipment, a transition to a less battery-demanding radio resource control state or mode.

Reference is now made to FIG. 1. FIG. 1 is a block diagram showing the various modes and states for the radio resource control portion of a protocol stack in a UMTS network. In particular, the RRC can be either in an RRC idle state 110 or an RRC connected state 120.

Figure 8:
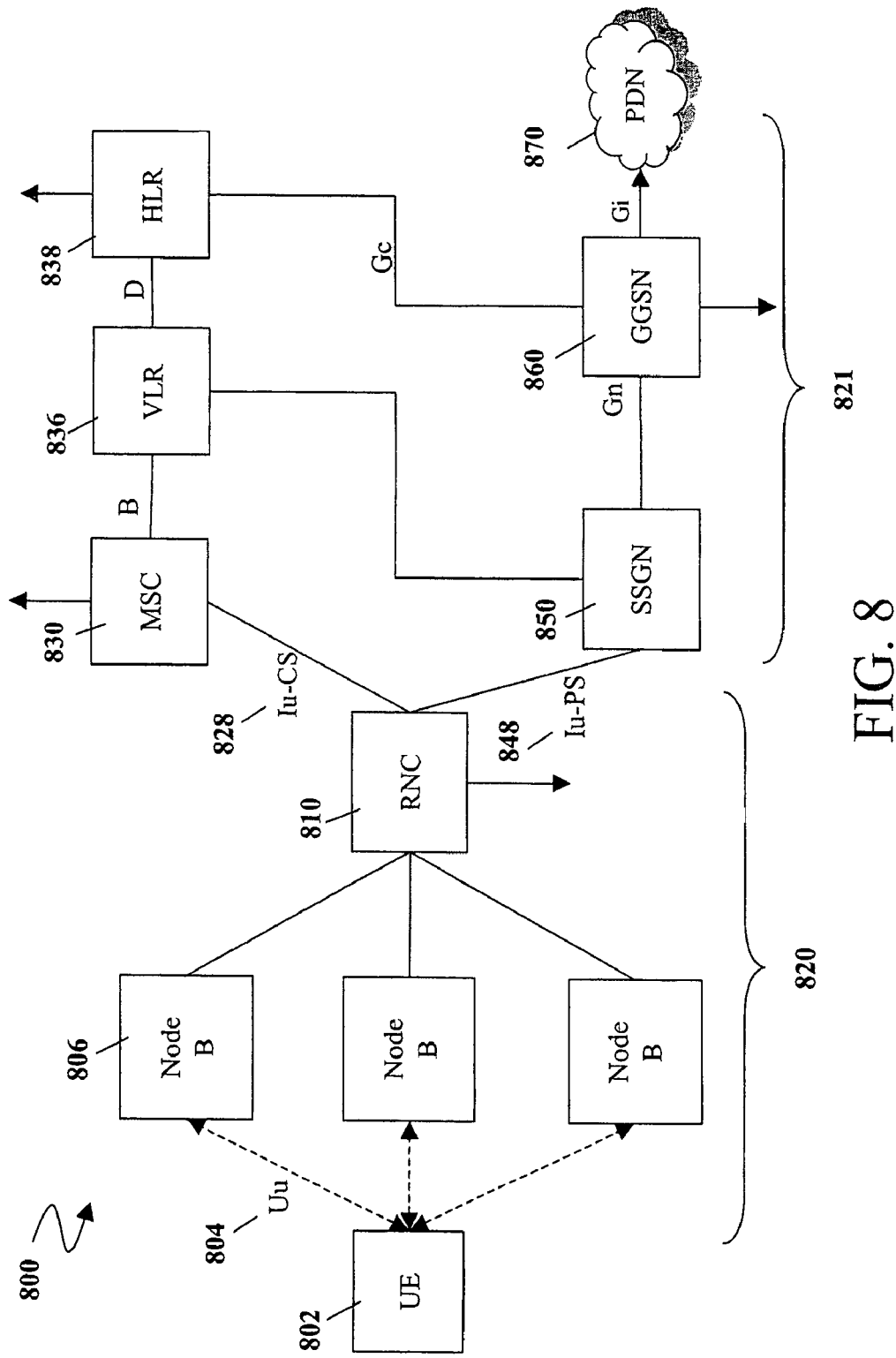
FIG. 8 is an exemplary network for use in association with the present method and apparatus.

As will be appreciated by those skilled in the art, a UMTS network consists of two land-based network segments. These are the Core Network (CN) and the Universal Terrestrial Radio-Access Network (UTRAN) (as illustrated in FIG. 8). The Core Network is responsible for the switching and routing of data calls and data connections to the external networks while the UTRAN handles all radio-related functionalities.

In idle mode 110, the UE must request an RRC connection to set up the radio resource whenever data needs to be exchanged between the UE and the network. This can be as a result of either an application on the UE requiring a connection to send data, or as a result of the UE monitoring a paging channel to indicate whether the UTRAN or SGSN has paged the UE to receive data from an external data network such as a push server. In addition, the UE also requests RRC connection whenever it needs to send a Mobility Management signaling message such as a Location Area Update.

Once the UE has sent a request to the UTRAN to establish a radio connection, the UTRAN chooses a state for the RRC connection to be in. Specifically, the RRC connected mode 120 includes four separate states. These are CELL_DCH state 122, CELL_FACH state 124, CELL_PCH state 126 and URA_PCH state 128.

From idle mode 110 the RRC connected state can either go to the Cell Dedicated Channel (CELL_DCH) state 122 or the Cell Forward Access Channel (CELL_FACH) state 124.

In CELL_DCH state 122, a dedicated channel is allocated to the UE for both uplink and downlink to exchange data. This state, since it has a dedicated physical channel allocated to the UE, typically requires the most battery power from the UE.

Alternatively, the UTRAN can move from idle mode 110 to a CELL_FACH state 124. In a CELL_FACH 124, state no dedicated channel is allocated to the UE. Instead, common channels are used to send signaling in a small amount of bursty data. However, the UE still has to continuously monitor the FACH, and therefore it consumes battery power.

Within the RRC connected mode 120, the RRC state can be changed at the discretion of the UTRAN. Specifically, if data inactivity is detected for a specific amount of time or data throughput below a certain threshold is detected, the UTRAN may move the RRC state from CELL_DCH state 122 to the CELL_FACH state 124, CELL_PCH state 126 or URA_PCH state 128. Similarly, if the payload is detected to be above a certain threshold then the RRC state can be moved from CELL_FACH state 124 to CELL_DCH state 122.

From CELL_FACH state 124, if data inactivity is detected for a predetermined time in some networks, the UTRAN can move the RRC state from CELL_FACH state 124 to a paging channel (PCH) state. This can be either the CELL_PCH state 126 or URA_PCH state 128.

From CELL_PCH state 126 or URA_PCH state 128 the UE must move to CELL_FACH state 124 in order to initiate an update procedure to request a dedicated channel. This is the only state transition that the UE controls.

CELL_PCH state 126 and URA_PCH state 128 use a discontinuous reception cycle (DRX) to monitor broadcast messages and pages by a Paging Indicator Channel (PICH). No uplink activity is possible.

Figure 2:
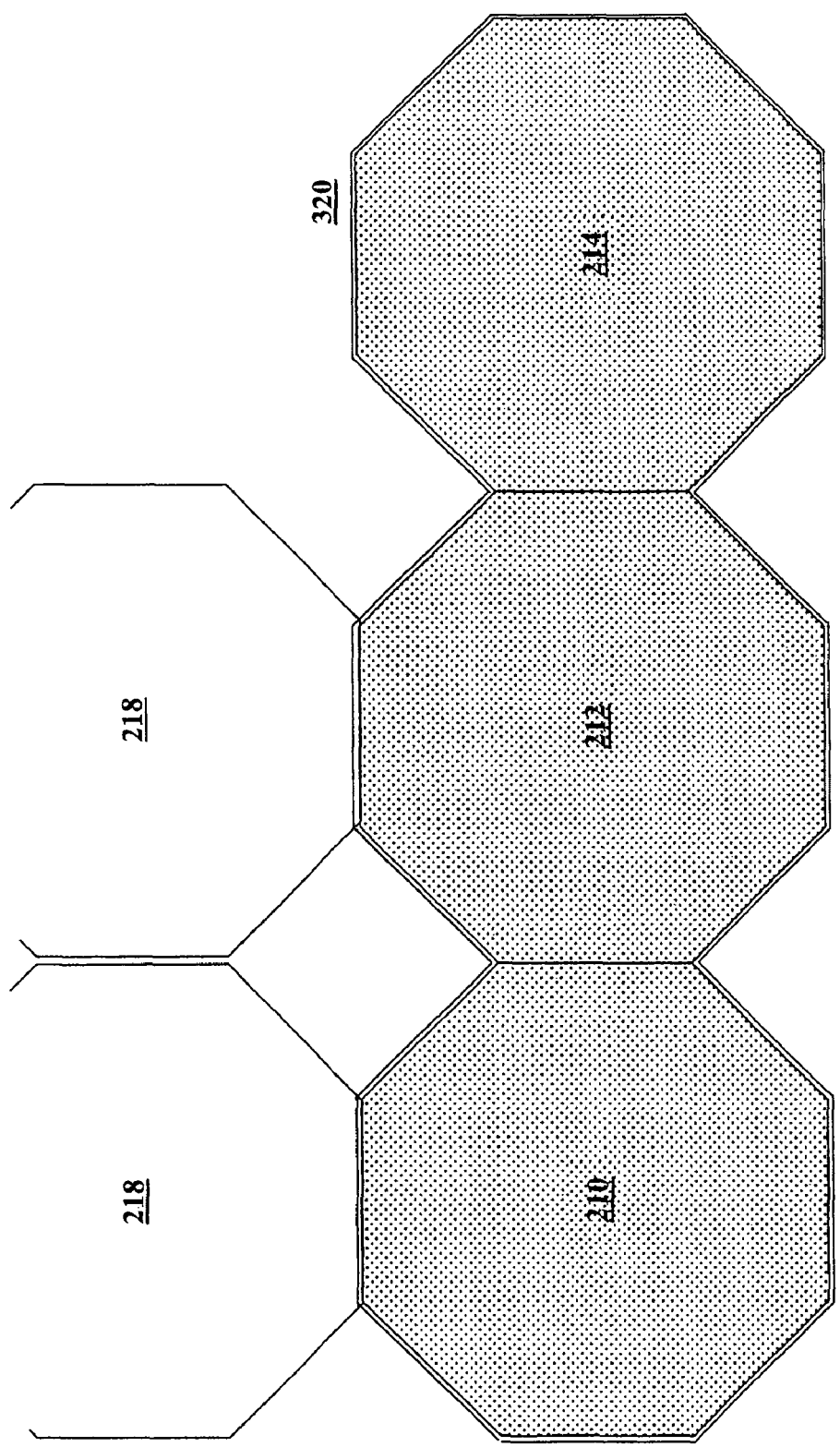
FIG. 2 is a schematic of a UMTS network showing various UMTS cells and a URA.

The difference between CELL_PCH state 126 and URA_PCH state 128 is that the URA_PCH state 128 only triggers a URA Update procedure if the UE's current UTRAN registration area (URA) is not among the list of URA identities present in the current cell. Specifically, reference is made to FIG. 2. FIG. 2 shows an illustration of various UMTS cells 210, 212 and 214. All of these cells require a cell update procedure if reselected to a CELL_PCH state 126. However, in a UTRAN registration area, each will be within the same UTRAN registration area 220, and thus a URA update procedure is not triggered when moving between 210, 212 and 214 when in a URA_PCH mode.

As seen in FIG. 2, other cells 218 are outside the URA 220, and can be part of a separate URA or no URA.

As will be appreciated by those skilled in the art, from a battery life perspective the idle state provides the lowest battery usage compared with the states above. Specifically, because the UE is required to monitor the paging channel only at intervals, the radio does not need to continuously be on, but will instead wake up periodically. The trade-off for this is the latency to send data. However, if this latency is not too great, the advantages of being in the idle mode and saving battery power outweigh the disadvantages of the connection latency.

Reference is again made to FIG. 1. Various UMTS infrastructure vendors move between states 122, 124, 126 and 128 based on various criteria. Exemplary infrastructures are outlined below.

In a first exemplary infrastructure, the RRC moves between an idle mode and a CELL_DCH state 122 directly. In the CELL_DCH state 122, if two seconds of inactivity are detected, the RRC state changes to a CELL_FACH state 124. If in CELL_FACH state 124, ten seconds of inactivity are detected then the RRC state changes to CELL PCH state 126. Forty five minutes of inactivity in CELL_PCH states 126 will result in the RRC state moving back to idle mode 110.

In a second exemplary infrastructure, RRC transition can occur between an idle mode 110 and connected mode 120 depending on a payload threshold. In the second infrastructure, if the payload is below a certain threshold then the UTRAN moves the RRC state to CELL_FACH state 124. Conversely, if the data is above a certain payload threshold then the UTRAN moves the RRC state to CELL_DCH state 122. In the second infrastructure, if two minutes of inactivity are detected in CELL_DCH state 122, the UTRAN moves the RRC state to CELL_FACH state 124. After five minutes of inactivity in the CELL_FACH state 124, the UTRAN moves the RRC stage to CELL_PCH state 126. In CELL_PCH state 126, two hours of inactivity are required before moving back to idle mode 110.

In a third exemplary infrastructure, movement between idle mode 110 and connected mode 120 is always to CELL_DCH state 122. After five seconds of inactivity in CELL_DCH state 122 the UTRAN moves the RRC state to CELL_FACH state 124. Thirty seconds of inactivity in CELL_FACH state 124 result in the movement back to idle mode 110.

In a fourth exemplary infrastructure the RRC transitions from an idle mode 110 to a connected mode 120 directly into a CELL_DCH state 122. In the fourth exemplary infrastructure, CELL_DCH state 122 includes two sub-states. The first includes a sub-state which has a high data rate and a second sub-state includes a lower data rate, but still within the CELL_DCH state 122. In the fourth exemplary infrastructure, the RRC transitions from idle mode 110 directly into the high data rate CELL_DCH sub-state. After 10 seconds of inactivity the RRC state transitions to a low data rate CELL_DCH state 122. Seventeen seconds of inactivity from the low data CELL_DCH state 122 result in the RRC state changing it to idle mode 110.

The above four exemplary infrastructures show how various UMTS infrastructure vendors are implementing the states. As will be appreciated by those skilled in the art, in each case, if the time spent on exchanging actual data (such as an email) is significantly short compared to the time that is required to stay in the CELL_DCH or the CELL_FACH states 122, 124, this causes unnecessary current drain which makes user experience in newer generation networks such as UMTS worse than in prior generation networks such as GPRS.

Further, although the CELL_PCH state 126 is more optimal than the CELL_FACH state 124 from a battery life perspective, the DRX cycle in a CELL_PCH state 126 is typically set to a lower value than the idle mode 110. As a result, the UE is required to wake up more frequently in the CELL_PCH state 126 than in an idle mode.

The URA_PCH state 128 with a DRX cycle similar to that of the idle state is likely the optimal trade up between battery life and latency for connection. However, URA_PCH is currently not supported in the UTRAN. It is therefore desirable to quickly transition to the idle mode as quickly as possible after an application is finished with the data exchange from a battery life perspective.

Figure 3:
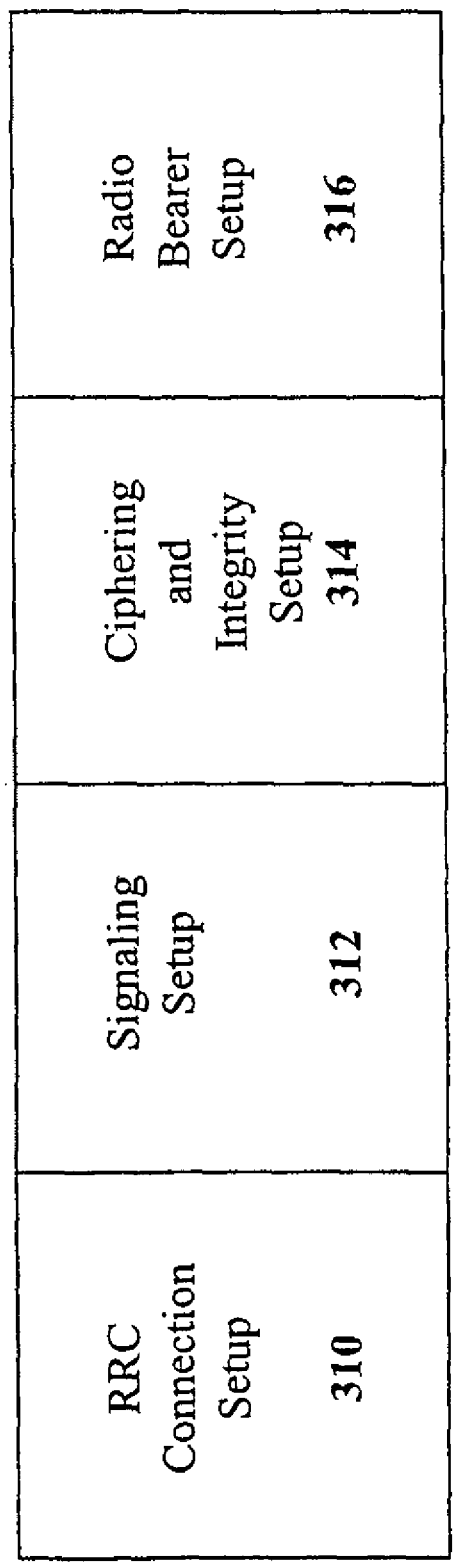
FIG. 3 is a block diagram showing the various stages in an RRC connection setup.

Reference is now made to FIG. 3. When transitioning from an idle mode 110 to a connected mode 120, various signaling and data connections need to be made. Referring to FIG. 3, the first item needing to be performed is an RRC connection setup 310. As indicated above, this RRC connection setup 310 can only be torn down by the UTRAN.

Once RRC connection setup 310 is accomplished, a signaling connection setup 312 is started.

Once signaling connection setup 312 is finished, a ciphering and integrity setup 314 is started. Upon completion of this, a radio bearer setup 316 is accomplished. At this point, data can be exchanged between the UE and UTRAN.

Tearing down a connection is similarly accomplished in the reverse order, in general. The radio bearer setup 316 is taken down and then the RRC connection setup 310 is taken down. At this point, the RRC moves into idle mode 110 as illustrated in FIG. 1.

Although the current 3GPP specification does not allow the UE to release the RRC connection or indicate its preference for the RRC state, the UE can still indicate termination of a signaling connection for a specified core network domain such as the Packet Switched (PS) domain used by packet-switched applications. According to section 8.1.14.1 of 3GPP TS 25.33:

The signaling connection release indication procedure is used by the UE to indicate to the UTRAN that one of its signaling connections has been released.

This procedure may in turn initiate the RRC connection release procedure.

Thus staying within the current 3GPP specifications, signaling connection release may be initiated upon the tearing down of the signaling connection setup 312. It is within the ability of the UE to tear down signaling connection setup 312, and this in turn according to the specification "may" initiate the RRC connection release.

As will be appreciated by those skilled in the art, if signaling connection setup 312 is torn down, the UTRAN will also need to clean up ciphering and integrity setup 314 and radio bearer setup 316 after the signaling connection setup 312 has been torn down.

If signaling connection setup 312 is torn down, the RRC connection 310 setup is typically brought down by the network for current vendor infrastructures.

Using the above, if the UE determines that it is done with the exchange of data, for example if an "RRC connection manager" component of the UE software is provided with an indication that the exchange of data is complete, then the RRC connection manager may determine whether or not to tear down the signaling connection setup 312. For example, an email application on the device sends an indication that it has received an acknowledgement from the push email server that the email was indeed received by the push server. The RRC manager can keep track of all existing applications, associated PDP contexts, associated PS radio bearers and associated circuit switched (CS) radio bearers. A delay in this case can be introduced to ensure that the application is truly finished with data exchange and no longer requires an RRC connection even after it has sent the "done" indication. This delay is equivalent to inactivity timeout associated with the application. Each application can have its own inactivity timeout. For example, an email application can have an inactivity timeout of five seconds, whereas an active browser application can have a timeout of sixty seconds. Based on a composite status of all such indications from active applications, the UE software decides how long it should wait before it can initiate a signaling connection release of the appropriate core network (e.g. PS Domain).

The inactivity timeout can be made dynamic based on a traffic pattern history and/or application profile.

Whenever the RRC connection manager determines with some probability that no application is expected the exchange of data, it can send a signaling connection release indication procedure for the appropriate domain.

The above UE-initiated transition to idle mode 110 can happen in any stage of the RRC connected mode 120 as illustrated in FIG. 1 and ends up having the network release the RRC connection and moving to an idle mode 110 as illustrated in FIG. 1. This is also applicable when the UE is performing any packet data services during a voice call. In this case only the PS domain is released, but the CS domain remains connected.

As will be appreciated by those skilled in the art, in some cases it may be more desirable to be in the connected mode state URA_PCH than in idle mode 110. For example, if the latency for connection to the CELL_DCH or the CELL_FACH connected mode states is required to be lower, it is preferable to be in a connected mode PCH state. There are two ways of accomplishing this. First is by changing the 3GPP specifications to allow for the UE to request the that UTRAN move it to a specific state, in this case the URA_PCH state 128.

Alternatively, the RRC connection manager may take into account other factors such as what state the RRC connection is currently in. If, for example, the RRC connection is in the URA_PCH state 128, it may decide that it is unnecessary to move to idle mode 110 and thus no Signaling connection release procedure is initiated.

Figure 4A:
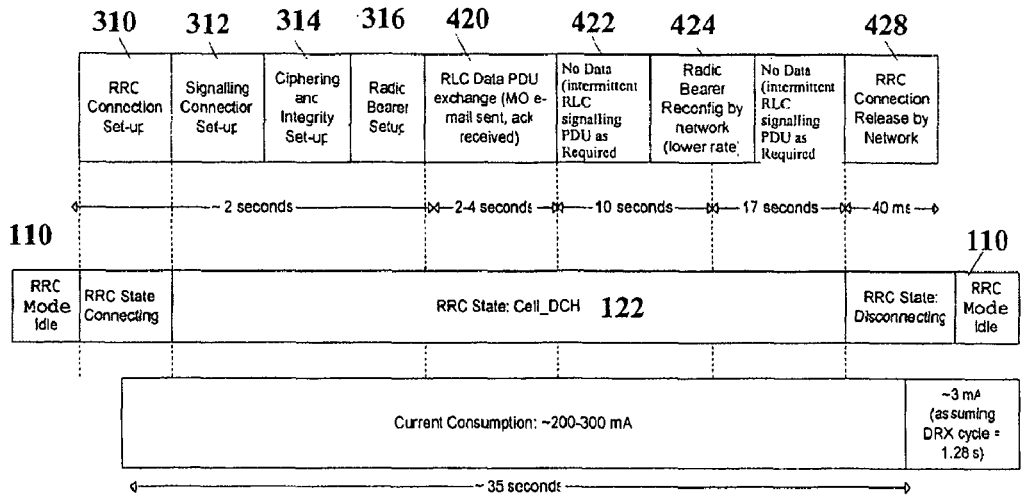
FIG. 4A is a block diagram of an exemplary transition between a CELL_DCH connected mode state and an idle mode initiated by the UTRAN according to the current method.

Reference is made to FIG. 4. FIG. 4A shows a current UMTS implementation according to the infrastructure "four" example above. As illustrated in FIG. 4, time is across the horizontal axes.

The UE starts in RRC idle state 110 and based on local data needing to be transmitted or a page received from the UTRAN, starts to establish an RRC connection.

As illustrated in FIG. 4A, RRC connection setup 310 occurs first, and the RRC state is a connecting state 410 during this time.

Next, signaling connection setup 312, ciphering and integrity setup 314, and radio bearer setup 316 occur. The RRC state is CELL_DCH state 122 during this. As illustrated in FIG. 4A, the time for moving from RRC idle to the time that the radio bearer is set up is approximately two seconds in this example.

Data is next exchanged. In the example FIG. 4A this is achieved in about two to four seconds and is illustrated by step 420.

After data is exchanged in step 420, no data is being exchanged except for intermittent RLC signaling PDU as required and thus the radio bearer is reconfigured by the network to move into a lower data rate DCH state after approximately ten seconds. This is illustrated in steps 422 and 424.

In the lower data rate DCH state nothing is received for seventeen seconds, at which point the RRC connection is released by the network in step 428.

Once the RRC connection is initiated in step 428, the RRC state proceeds to a disconnecting state 430 for approximately forty milliseconds, after which the UE is in an RRC idle state 110.

Also illustrated in FIG. 4A, the UE current consumption is illustrated for the period in which the RRC is in CELL_DCH state 122. As seen, the current consumption is approximately 200 to 300 milliamps for the entire duration of the CELL_DCH state 122. During disconnect and idle, about 3 milliamps are utilized, assuming a DRX cycle of 1.28 seconds. However, the 35 seconds of current consumption at 200 to 300 milliamps is draining on the battery.

Figure 4B:
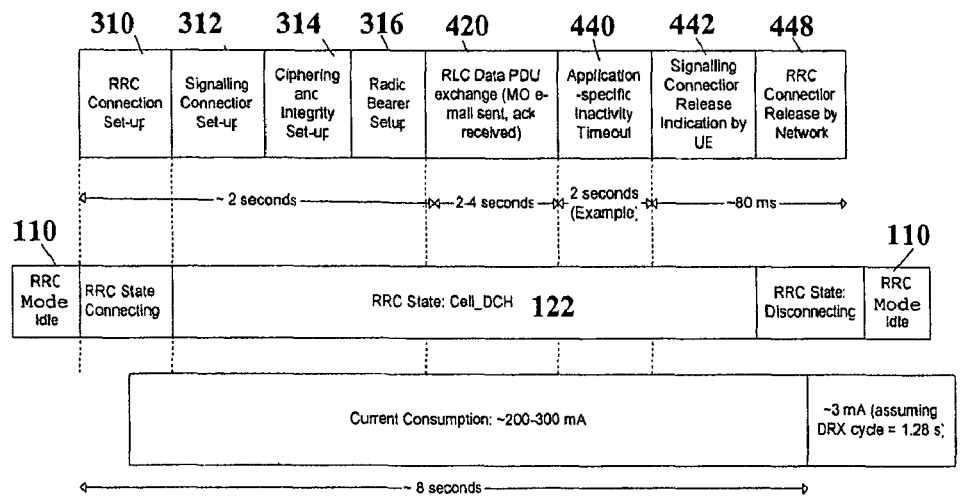
FIG. 4B is a block diagram showing an exemplary transition between a CELL_DCH state connected mode transition to an idle mode according to the present method and apparatus.

Reference is now made to FIG. 4B. FIG. 4B utilizes the same exemplary infrastructure "four" from above, only now implementing the signaling connection release.

As illustrated in FIG. 4B, the same setup steps 310, 312, 314 and 316 occur and this takes the same amount of time when moving between RRC idle state 110 and RRC CELL_DCH state 122.

Further, the RRC data PDU exchange for the exemplary email of FIG. 4A is also done at FIG. 4B and this takes approximately two to four seconds.

The UE in the example of FIG. 4B has an application-specific inactivity timeout, which in the example of FIG. 4B is two seconds and is illustrated by step 440. After the RRC connection manager has determined that there is inactivity for the specific amount of time, the UE releases the signaling connection setup 312 in step 442 and the RRC connection is released by the network in step 428.

As illustrated in FIG. 4B, the current consumption during the CELL_DCH step 122 is still about 200 to 300 milliamps. However, the connection time is only about eight seconds. As will be appreciated by those skilled in the art, the considerably shorter amount of time that the mobile device stays in the CELL_DCH state 122 results in significant battery savings for a UE device that is always on.

Reference is now made to FIG. 5. FIG. 5 shows a second example using the infrastructure indicated above as infrastructure "three". As with FIGS. 4A and 4B, a connection setup occurs which takes approximately two seconds. This requires the RRC connection setup 310, the signaling connection setup 312, the ciphering and integrity setup 314 and the radio bearer setup 316.

During this setup, the UE moves from RRC idle mode 110 to a CELL_DCH state 122 with an RRC state connecting step 410 in between.

Figure 5A:
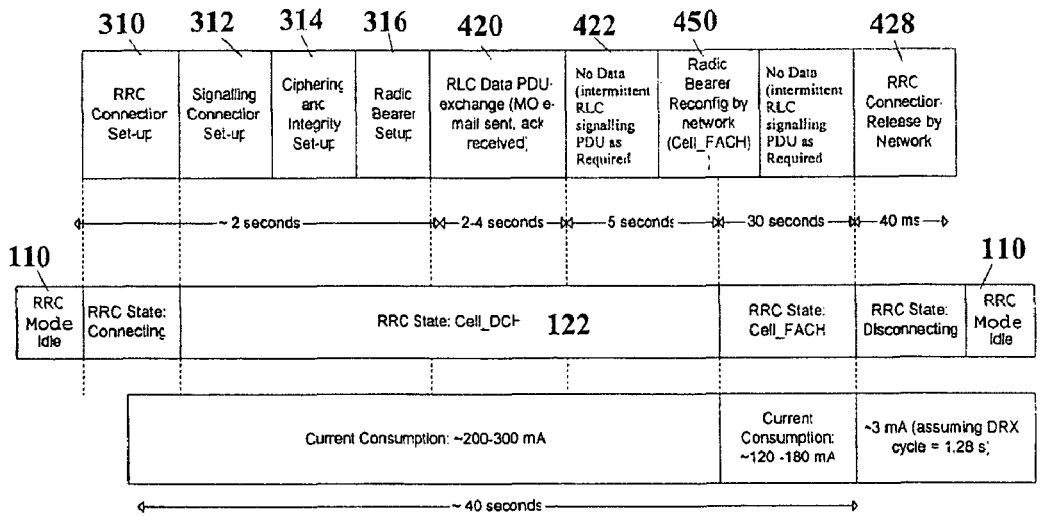
FIG. 5A is a block diagram of an exemplary transition between a CELL_DCH inactivity to a CELL_FACH inactivity to an idle mode initiated by the UTRAN according to the current method.

As with FIG. 4A, in FIG. 5A RLC data PDU exchange occurs, and in the example of FIG. 5A takes two to four seconds.

According to the infrastructure three, RLC signaling PDU exchange receives no data and thus is idle for a period of five seconds in step 422, except for intermittent RLC signaling PDU as required, at which point the radio bearer reconfigures the network to move into a CELL_FACH state 124 from CELL_DCH state 122. This is done in step 450.

In the CELL_FACH state 124, the RLC signaling PDU exchange finds that there is no data except for intermittent RLC signaling PDU as required for a predetermined amount of time, in this case thirty seconds, at which point an RRC connection release by the network is performed in step 428.

As seen in FIG. 5A, this moves the RRC state to idle mode 110.

As further seen in FIG. 5A, the current consumption during the DCH mode is between 200 and 300 milliamps. When moving into CELL_FACH state 124 the current consumption lowers to approximately 120 to 180 milliamps. After the RRC connector is released and the RRC moves into idle mode 110 the power consumption is approximately 3 milliamps.

The UTRA RRC Connected Mode state being CELL_DCH state 122 or CELL_FACH state 124 lasts for approximately forty seconds in the example of FIG. 5A.

Figure 5B:
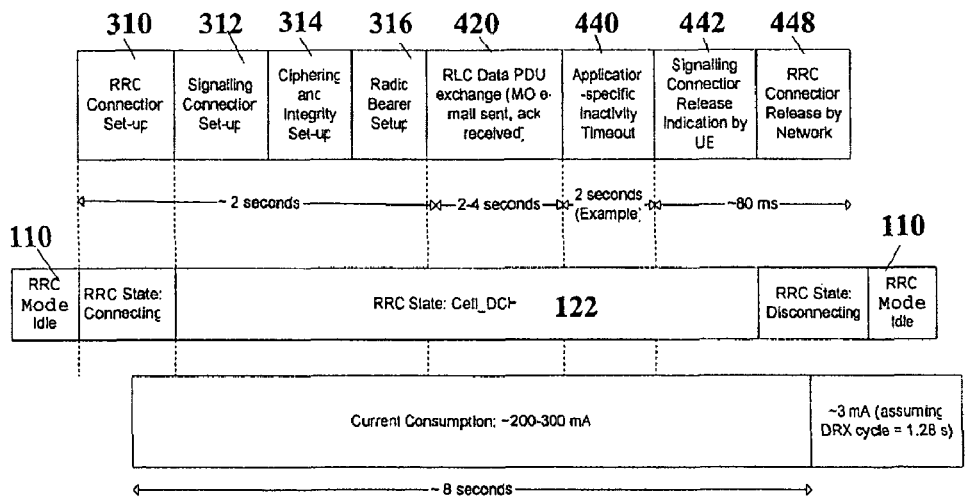
FIG. 5B is a block diagram of an exemplary transition between CELL_DCH inactivity and an idle mode according to the present method.

Reference is now made to FIG. 5B. FIG. 5B illustrates the same infrastructure "three" as FIG. 5A with the same connection time of about two seconds to get the RRC connection setup 310, signaling connection setup 312, ciphering and integrity setup 314 and radio bearer setup 316. Further, RLC data PDU exchange 420 takes approximately two to four seconds.

As with FIG. 4B, a UE application detects a specific inactivity timeout in step 440, at which point the signalling connection release indication procedure is initiated by the UE and as a consequence the RRC connection is released by the network in step 448.

As can be seen further in FIG. 5B, the RRC starts in an idle mode 110 and moves to a CELL_DCH state 122 without proceeding into the CELL_FACH state 124.

As will be seen further in FIG. 5B, current consumption is approximately 200 to 300 milliamps in the time that the RRC stage is in CELL_DCH state 122 which according to the example of FIG. 5 is approximate eight seconds.

Therefore, a comparison between FIGS. 4A and 4B, and FIGS. 5A and 5B shows that a significant amount of current consumption is eliminated, thereby extending the battery life of the UE significantly. As will be appreciated by those skilled in the art, the above can further be used in the context of current 3GPP specs.

Figure 6:
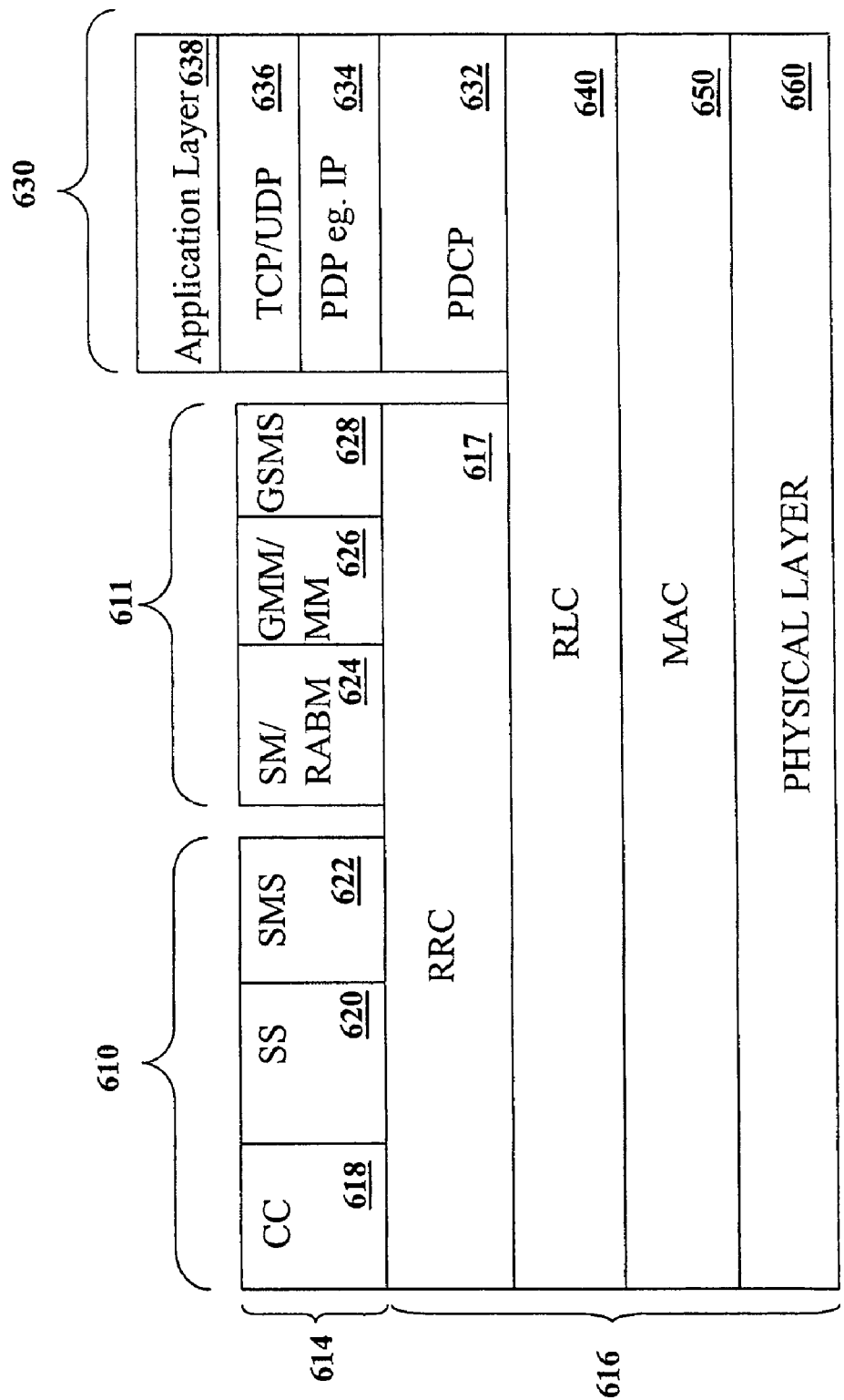
FIG. 6 is a block diagram of a UMTS protocol stack.

Reference is now made to FIG. 6. FIG. 6 illustrates a protocol stack for a UMTS network.

As seen in FIG. 6, the UMTS includes a CS control plane 610, PS control plane 611, and PS user plane 630.

Within these three planes, a non-access stratum (NAS) portion 614 and an access stratum portion 616 exist.

NAS portion 614 in CS control plane 610 includes a call control (CC) 618, supplementary services (SS) 620, and short message service (SMS) 622.

NAS portion 614 in PS control plane 611 includes both mobility management (MM) and GPRS mobility management (GMM) 626. It further includes SM/RABM 624 and GSMS 628.

CC 618 provides for call management signaling for circuit switched services. The session management portion of SM/RABM 624 provides for PDP context activation, deactivation and modification. SM/RABM 624 also provides for quality of service negotiation.

The main function of the RABM portion of the SM/RABM 624 is to connect a PDP context to a Radio Access Bearer.

Thus SM/RABM 624 is responsible for the setup, modification and release of radio bearers.

CS control plane 610 and PS control plane 611, in the access stratum 616 sit on radio resource control (RRC) 617.

NAS portion 614 in PS user plane 630 includes an application layer 638, TCP/UDP layer 636, and PDP layer 634. PDP layer 634 can, for example, include Internet protocol (IP).

Access Stratum 616, in PS user plane 630 includes packet data convergence protocol (PDCP) 632. PDCP 632 is designed to make the WCDMA protocol suitable to carry TCP/IP protocol between UE and RNC (as seen in FIG. 8), and is optionally for IP traffic stream protocol header compression and decompression.

The UMTS Radio Link Control (RLC) 640 and Medium Access Control (MAC) layers 650 form the data link sublayers of the UMTS radio interface and reside on the RNC node and the User Equipment.

The Layer 1 (L1) UMTS layer (physical layer 650) is below the RLC/MAC layers 640 and 650. This layer is the physical layer for communications.

Figure 7:
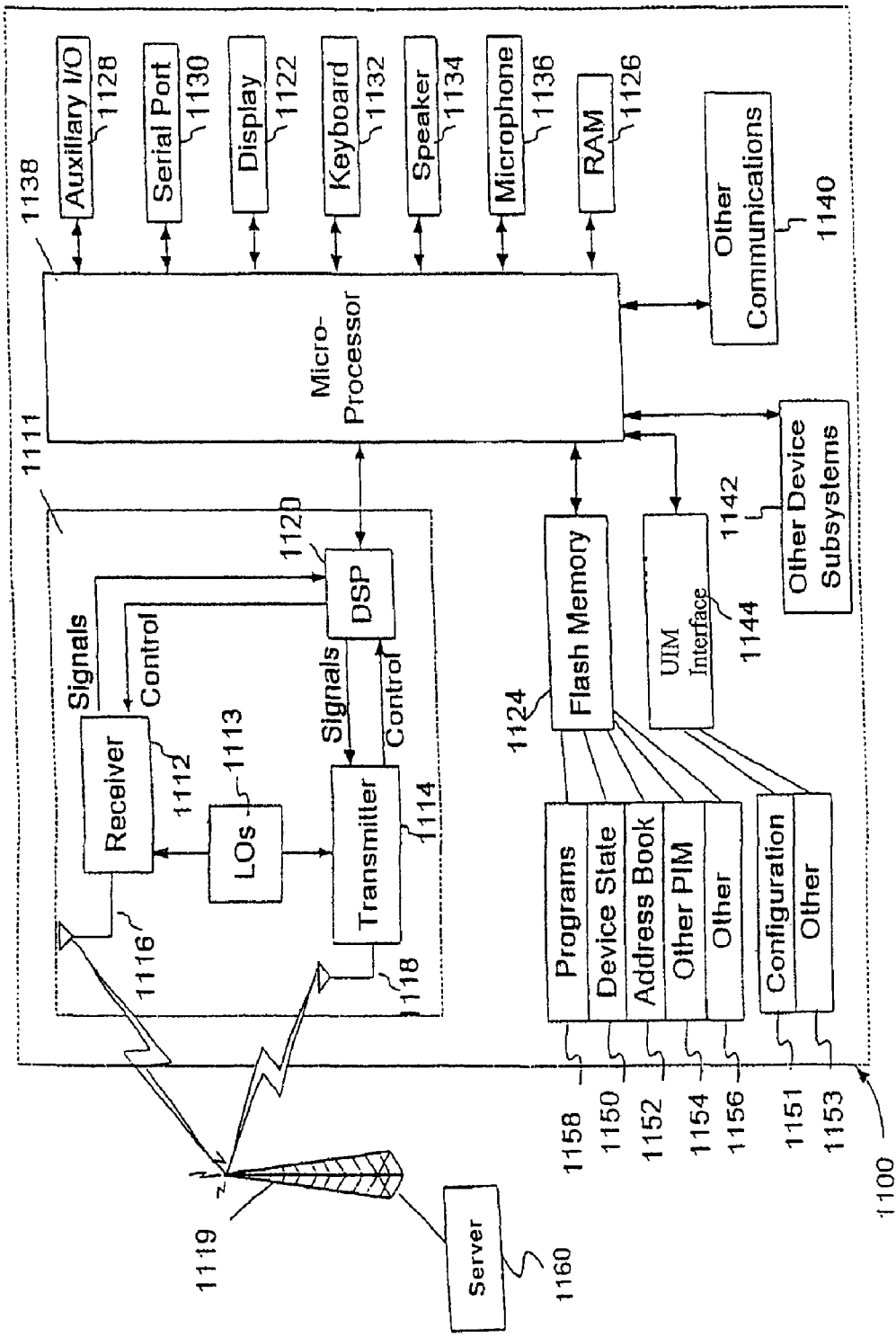
FIG. 7 is an exemplary UE that can be used in association with the present method.

While the above can be implemented on a variety of mobile devices, an example of one mobile device is outlined below with respect to FIG. 7. Reference is now made to FIG. 7.

UE 1100 is preferably a two-way wireless communication device having at least voice and data communication capabilities. UE 1100 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where UE 1100 is enabled for two-way communication, it will incorporate a communication subsystem 1111, including both a receiver 1112 and a transmitter 1114, as well as associated components such as one or more, preferably embedded or internal, antenna elements 1116 and 1118, local oscillators (LOs) 1113, and a processing module such as a digital signal processor (DSP) 1120. As will be apparent to those skilled in the field of communications, the particular design of the communication subsystem 1111 will be dependent upon the communication network in which the device is intended to operate. For example, UE 1100 may include a communication subsystem 1111 designed to operate within the GPRS network or UMTS network.

Network access requirements will also vary depending upon the type of network 1119. For example, In UMTS and GPRS networks, network access is associated with a subscriber or user of UE 1100. For example, a GPRS mobile device therefore requires a subscriber identity module (SIM) card in order to operate on a GPRS network. In UMTS a USIM or SIM module is required. In CDMA a RUIM card or module is required. These will be referred to as a UIM interface herein. Without a valid UIM interface, a mobile device may not be fully functional. Local or non-network communication functions, as well as legally required functions (if any) such as emergency calling, may be available, but mobile device 1100 will be unable to carry out any other functions involving communications over the network 1100. The UIM interface 1144 is normally similar to a card-slot into which a card can be inserted and ejected like a diskette or PCMCIA card. The UIM card can have approximately 64K of memory and hold many key configurations 1151, and other information 1153 such as identification, and subscriber-related information.

When required network registration or activation procedures have been completed, UE 1100 may send and receive communication signals over the network 1119. Signals received by antenna 1116 through communication network 1119 are input to receiver 1112, which may perform such common receiver functions as signal amplification, frequency down conversion, filtering, channel selection and the like, and in the example system shown in FIG. 7, analog to digital (A/D) conversion. A/D conversion of a received signal allows more complex communication functions such as demodulation and decoding to be performed in the DSP 1120. In a similar manner, signals to be transmitted are processed, including modulation and encoding for example, by DSP 1120 and input to transmitter 1114 for digital to analog conversion, frequency up conversion, filtering, amplification and transmission over the communication network 1119 via antenna 1118. DSP 1120 not only processes communication signals, but also provides for receiver and transmitter control. For example, the gains applied to communication signals in receiver 1112 and transmitter 1114 may be adaptively controlled through automatic gain control algorithms implemented in DSP 1120.

Network 1119 may further communicate with multiple systems, including a server 1160 and other elements (not shown). For example, network 1119 may communicate with both an enterprise system and a web client system in order to accommodate various clients with various service levels.

UE 1100 preferably includes a microprocessor 1138 which controls the overall operation of the device. Communication functions, including at least data communications, are performed through communication subsystem 1111. Microprocessor 1138 also interacts with further device subsystems such as the display 1122, flash memory 1124, random access memory (RAM) 1126, auxiliary input/output (I/O) subsystems 1128, serial port 1130, keyboard 1132, speaker 1134, microphone 1136, a short-range communications subsystem 1140 and any other device subsystems generally designated as 1142.

Some of the subsystems shown in FIG. 7 perform communication-related functions, whereas other subsystems may provide "resident" or on-device functions. Notably, some subsystems, such as keyboard 1132 and display 1122, for example, may be used for both communication-related functions, such as entering a text message for transmission over a communication network, and device-resident functions such as a calculator or task list.

Operating system software used by the microprocessor 1138 is preferably stored in a persistent store such as flash memory 1124, which may instead be a read-only memory (ROM) or similar storage element (not shown). Those skilled in the art will appreciate that the operating system, specific device applications, or parts thereof, may be temporarily loaded into a volatile memory such as RAM 1126. Received communication signals may also be stored in RAM 1126. Further, a unique identifier is also preferably stored in read-only memory.

As shown, flash memory 1124 can be segregated into different areas for both computer programs 1158 and program data storage 1150, 1152, 1154 and 1156. These different storage types indicate that each program can allocate a portion of flash memory 1124 for their own data storage requirements. Microprocessor 1138, in addition to!its operating system functions, preferably enables execution of software applications on the mobile device. A predetermined set of applications that control basic operations, including at least data and voice communication applications for example, will normally be installed on UE 1100 during manufacturing. A preferred software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application would preferably have the ability to send and receive data items, via the wireless network 1119. In a preferred embodiment, the PIM data items are seamlessly integrated, synchronized and updated, via the wireless network 1119, with the mobile device user's corresponding data items stored or associated with a host computer system. Further applications may also be loaded onto the mobile device 1100 through the network 1119, an auxiliary I/O subsystem 1128, serial port 1130, short-range communications subsystem 1140 or any other suitable subsystem 1142, and installed by a user in the RAM 1126 or preferably a non-volatile store (not shown) for execution by the microprocessor 1138. Such flexibility in application installation increases the functionality of the device and may provide enhanced on-device functions, communication-related functions, or both. For example, secure communication applications may enable electronic commerce functions and other such financial transactions to be performed using the UE 1100. These applications will however; according to the above, in many cases need to be approved by a carrier.

In a data communication mode, a received signal such as a text message or web page download will be processed by the communication subsystem 1111 and input to the microprocessor 1138, which preferably further processes the received signal for output to the display 1122, or alternatively to an auxiliary I/O device 1128. A user of UE 1100 may also compose data items such as email messages for example, using the keyboard 1132, which is preferably a complete alphanumeric keyboard or telephone-type keypad, in conjunction with the display 1122 and possibly an auxiliary I/O device 1128. Such composed items may then be transmitted over a communication network through the communication subsystem 1111.

For voice communications, overall operation of UE 1100 is similar, except that received signals would preferably be output to a speaker 1134 and signals for transmission would be generated by a microphone 1136. Alternative voice or audio I/O subsystems, such as a voice message recording subsystem, may also be implemented on UE 1100. Although voice or audio signal output is preferably accomplished primarily through the speaker 1134, display 1122 may also be used to provide an indication of the identity of a calling party, the duration of a voice call, or other voice call-related information for example.

Serial port 1130 in FIG. 7 would normally be implemented in a personal digital assistant (PDA)-type mobile device for which synchronization with a user's desktop computer (not shown) may be desirable. Such a port 1130 would enable a user to set preferences through an external device or software application and would extend the capabilities of mobile device 1100 by providing for information or software downloads to UE 1100 other than through a wireless communication network. The alternate download path may for example be used to load an encryption key onto the device through a direct and thus reliable and trusted connection to thereby enable secure device communication.

Alternatively, serial port 1130 could be used for other communications, and could include a universal serial bus (USB) port. An interface is associated with serial port 1130.

Other communications subsystems 1140, such as a short-range communications subsystem, is a further optional component which may provide for communication between UE 1100 and different systems or devices, which need not necessarily be similar devices. For example, the subsystem 1140 may include an infrared device and associated circuits and components or a Bluetooth™ communication module to provide for communication with similarly enabled systems and devices.

Reference is now made to FIG. 8. FIG. 8 is a block diagram of a communication system 800 which includes a UE 802 which communicates through a wireless communication network.

UE 802 communicates wirelessly with one of multiple Node Bs 806. Each Node B 806 is responsible for air interface processing and some radio resource management functions. Node B 806 provides functionality similar to a Base Transceiver Station in a GSM/GPRS networks.

The wireless link shown in communication system 800 of FIG. 8 represents one or more different channels, typically different radio frequency (RF) channels, and associated protocols used between the wireless network and UE 802. A Uu air interface 804 is used between UE 802 and Node B 806.

An RF channel is a limited resource that must be conserved, typically due to limits in overall bandwidth and a limited battery power of UE 802. Those skilled in the art will appreciate that a wireless network in actual practice may include hundreds of cells depending upon desired overall expanse of network coverage. All pertinent components may be connected by multiple switches and routers (not shown), controlled by multiple network controllers.

Each Node B 806 communicates with a radio network controller (RNC) 810. The RNC 810 is responsible for control of the radio resources in its area. One RNC 810 controls multiple Node Bs 806.

The RNC 810 in UMTS networks provides functions equivalent to the Base Station Controller (BSC) functions in GSM/GPRS networks. However, an RNC 810 includes more intelligence including, for example, autonomous handovers management without involving MSCs and SGSNs.

The interface used between Node B 806 and RNC 810 is an Iub interface 808. An NBAP (Node B application part) signaling protocol is primarily used, as defined in 3GPP TS 25.433 V3.11.0 (2002-09) and 3GPP TS 25.433 V5.7.0 (2004-01).

Universal Terrestrial Radio Access Network (UTRAN) 820 comprises the RNC 810, Node B 806 and the Uu air interface 804.

Circuit switched traffic is routed to Mobile Switching Centre (MSC) 830. MSC 830 is the computer that places the calls, and takes and receives data from the subscriber or from PSTN (not shown).

Traffic between RNC 810 and MSC 830 uses the Iu-CS interface 828. Iu-CS interface 828 is the circuit-switched connection for carrying (typically) voice traffic and signaling between UTRAN 820 and the core voice network. The main signaling protocol used is RANAP (Radio Access Network Application Part). The RANAP protocol is used in UMTS signaling between the Core Network 821, which can be a MSC 830 or SGSN 850 (defined in more detail below) and UTRAN 820. RANAP protocol is defined in 3GPP TS 25.413 V3.11.1 (2002-09) and TS 25.413 V5.7.0 (2004-01).

For all UEs 802 registered with a network operator, permanent data (such as UE 102 user's profile) as well as temporary data (such as UE's 802 current location) are stored in a home location registry (HLR) 838. In case of a voice call to UE 802, HLR 838 is queried to determine the current location of UE 802. A Visitor Location Register (VLR) 836 of MSC 830 is responsible for a group of location areas and stores the data of those mobile stations that are currently in its area of responsibility. This includes parts of the permanent mobile station data that have been transmitted from HLR 838 to the VLR 836 for faster access. However, the VLR 836 of MSC 830 may also assign and store local data, such as temporary identifications. UE 802 is also authenticated on system access by HLR 838.

Packet data is routed through Service GPRS Support Node (SGSN) 850. SGSN 850 is the gateway between the RNC and the core network in a GPRS/UMTS network and is responsible for the delivery of data packets from and to the UEs 802 within its geographical service area. Iu-PS interface 848 is used between the RNC 810 and SGSN 850, and is the packet-switched connection for carrying (typically) data traffic and signaling between the UTRAN 820 and the core data network. The main signaling protocol used is RANAP (described above).

The SGSN 850 communicates with the Gateway GPRS Support Node (GGSN) 860. GGSN 860 is the interface between the UMTS/GPRS network and other networks such as the Internet or private networks. GGSN 860 is connected to a public data network PDN 870 over a Gi interface.

Those skilled in the art will appreciate that the wireless network may be connected to other systems, possibly including other networks, not explicitly shown in FIG. 8. A network will normally be transmitting at the very least some sort of paging and system information on an ongoing basis, even if there is no actual packet data exchanged. Although the network consists of many parts, these parts all work together to result in certain behaviours at the wireless link.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

We claim:

1. A method for improving battery performance of a mobile user equipment used in a wireless network having multiple radio resource control (RRC) states, the user equipment capable of running a plurality of different applications, each of which is capable of exchanging data with the wireless network, the method comprising, at the user equipment:
   receiving an indication of data exchange completion from each application, at the mobile user equipment, that exchanged data with the wireless network while in an RRC state or mode;
   based on the data exchange completion indications received from each application that exchanged data in the RRC state or mode, determining when no application on the user equipment is expected to exchange data; and
   initiating a transition from the RRC state or mode to another, less battery demanding RRC state or mode if a determination is made that no application on the user equipment is expected to exchange data.

2. The method of claim 1, wherein said initiating comprises tearing down a signaling connection setup between the user equipment and the wireless network.

3. The method of claim 2, wherein said tearing down causes the network to release a signaling connection between the user equipment and the wireless network.

4. The method of claim 1, wherein the wireless network is a UMTS network.

5. The method of claim 4, wherein the RRC state is a CELL_DCH state or a CELL_FACH state.

6. The method of claim 4, wherein the RRC state is a CELL_PCH state qr a URA_PCH state.

7. The method of claim 4, wherein said initiating includes sending a message to the wireless network requesting transition to the other, less battery demanding RRC state or mode.

8. The method of claim 1, wherein the other less battery demanding state or mode is a state selected from the group consisting of one of a CELL_FACH state, a CELL_PCH state, a URA_PCH state, or an idle mode.

9. The method of claim 1, wherein the user equipment includes an RRC connection manager, which performs said receiving, said determining and said initiating.

10. The method of claim 9, wherein said determining includes determining when no application on the user equipment is expected to exchange data based on a composite status of the data exchange completion indications received from any application that exchanged data in the RRC state or mode.

11. The method of claim 1 further comprising tracking each application of the plurality of different applications that exchanged data with the wireless network while in an RRC state or mode.

12. A user equipment adapted for reducing battery consumption in a wireless network, the user equipment having a radio subsystem including a radio adapted to communicate with the wireless network; a radio processor having a digital signal processor and adapted to interact with said radio subsystem; memory; a user interface; a processor adapted to run a plurality of applications each of which is capable of exchanging data with the wireless network, the user equipment comprising:
 an RRC connection manager that is adapted and configured to: receive an indication of data exchange completion from each application, at the mobile user equipment, that exchanged data with the wireless network while in an RRC state or mode, and, based on the data exchange completion indications received from each application that exchanged data in the RRC state or mode, determine when no application on the user equipment is expected to exchange data; and initiate a transition from the RRC state or mode to another, less battery demanding state or mode if a determination is made that no application on the user equipment is expected to exchange data.

13. The user equipment of claim 12, wherein the RRC connection manager is adapted to tear down a signaling connection setup between the user equipment and the wireless network.

14. The user equipment of claim 13, wherein said RRC connection manager is adapted to determine when no application on the user equipment is expected to exchange data based on a composite status of the data exchange completion indications received from the applications that exchanged data in the RRC state or mode.

15. The user equipment of claim 13, wherein said RRC connection manager is adapted to determine when no application on the user equipment is expected to exchange data based on a delay to ensure that the applications that exchanged data in the RRC state or mode no longer require an RRC connection.

16. The user equipment of claim 13, wherein the RRC connection manager is adapted to cause the network to release a signaling connection between the user equipment and the wireless network by the tearing down of a signaling connection setup.

17. The user equipment of claim 12, wherein the RRC state or mode is a CELL_PCH state or a URA_PCH state.

18. The user equipment of claim 12, wherein the RRC connection manager is configured and arranged to send a message to the wireless network that requests a transition to the other, less battery-demanding RRC state or mode.

19. The user equipment of claim 18, wherein said other, less battery-demanding state or mode is one of a CELL_FACH state, a CELL_PCH state, a URA_PCH state, or an idle mode.

20. The user equipment of claim 19, wherein each of the plurality of different applications that exchanged data with the wireless network while in a RRC state or mode is an active application.

21. A method for improving battery performance of a mobile user equipment used in a wireless network having multiple radio resource control (RRC) states, the user equipment capable of running a plurality of different applications, each of which is capable of exchanging data with the wireless network, the method characterized by the steps of, at the user equipment:
 receiving an indication of data exchange completion from each of the plurality of different applications that exchanged data with the wireless network while in an RRC state;
 based on the data exchange completion indications received from the applications that exchanged data in the RRC state, determining when no application on the user equipment is expected to exchange data; and
 initiating a transition from the RRC state to another, less battery demanding RRC state or mode if a determination is made that no application on the user equipment is expected to exchange data;
 said user equipment including an RRC connection manager, which performs said receiving, determining and initiating steps,
wherein said determining step includes determining when no application on the user equipment is expected to exchange data based on a composite status of the data exchange completion indications received from the applications that exchanged data in the RRC state and, tracking associated Packet Data Protocol "PDP" contexts, packet switched "PS" radio access bearers, and PS radio bearers for said user equipment.

22. The method of claim 21, further comprising the step of blocking said initiating step if said RRC state is a URA_PCH state.

23. A method for improving battery performance of a mobile user equipment used in a wireless network having multiple radio resource control (RRC) states, the user equipment capable of running a plurality of different applications, each of which is capable of exchanging data with the wireless network, the method characterized by the steps of, at the user equipment:
 receiving an indication of data exchange completion from each of the plurality of different applications that exchanged data with the wireless network while in an RRC state;
 based on the data exchange completion indications received from the applications that exchanged data in the RRC state, determining when no application on the user equipment is expected to exchange data; and initiating a transition from the RRC state to another, less battery demanding RRC state or mode if a determination is made that no application on the user equipment is expected to exchange data and upon a delay to ensure that the applications that exchanged data in the RRC state no longer require an RRC connection.

24. The method of claim 23, wherein the delay is a composite of a plurality of inactivity timeout periods, each inactivity timeout period corresponding to a respective application that exchanged data with the wireless network while in the RRC state or mode.

25. The method of claim 24, wherein said delay is dynamic based on traffic pattern history and/or application profiles.

\* \* \* \* \*

UNITED STATES PATENT AND TRADEMARK OFFICE
CERTIFICATE OF CORRECTION

| | | |
|---|---|---|
| PATENT NO. | : 7,949,377 B2 | |
| APPLICATION NO. | : 11/302263 | |
| DATED | : May 24, 2011 | |
| INVENTOR(S) | : Muhammad Khaledul Islam et al. | |

It is certified that error appears in the above-identified patent and that said Letters Patent is hereby corrected as shown below:

On the Title Page, Item (57), in the Abstract, line 7, "battery demanding" should read --battery-demanding--.

In the Drawings:

In FIG. 4A, block 122, "Cell_DCH" should read --CELL_DCH--.

In FIG. 4A, block 310, line 3, "Set-up" should read --Setup--.

In FIG. 4A, block 312, line 1, "Signalling" should read --Signaling--; and line 3, "Set-up" should read --Setup--.

In FIG. 4A, block 314, line 4, "Set-up" should read --Setup--.

In FIG, 4A, block 422, line 4, "signalling" should read --signaling--.

In FIG. 4A, in the unnumbered block to the right of block 424, line 4, "signalling" should read --signaling--.

In FIG. 4B, block 122, "Cell_DCH" should read --CELL_DCH--.

In FIG. 4B, block 310, line 3, "Set-up" should read --Setup--.

In FIG, 4B, block 312, line 1, "Signalling" should read --Signaling--; and line 3, "Set-up" should read --Setup--.

In FIG. 4B, block 314, line 4, "Set-up" should read --Setup--.

In FIG. 4B, block 442, line 1, "Signalling" should read --Signaling--.

Signed and Sealed this
Sixth Day of March, 2012

David J. Kappos
*Director of the United States Patent and Trademark Office*

In FIG. 5A, block 122, "Cell_DCH" should read --CELL_DCH--.

In FIG. 5A, block 310, line 3, "Set-up" should read --Setup--.

In FIG. 5A, block 312, line 1, "Signalling" should read --Signaling--; and line 3, "Set-up" should read --Setup--.

In FIG. 5A, block 314, line 4, "Set-up" should read --Setup--.

In FIG. 5A, block 422, line 4, "signalling" should read --signaling--.

In FIG. 5A, block 450, line 5, "(Cell_FACH)" should read --(CELL_FACH)--.

In FIG. 5A, in the unnumbered block to the right of block 122, line 2, "Cell_FACH" should read --CELL_FACH--.

In FIG. 5 A, in the unnumbered block to the right of block 450, line 4, "signalling" should read --signaling--.

In FIG. 5B, block 122, "Cell_DCH" should read --CELL_DCH--.

In FIG. 5B, block 310, line 3, "Set-up" should read --Setup--.

In FIG. 5B, block 312, line 1, "Signalling" should read --Signaling--; and line 3, "Set-up" should read --Setup--.

In FIG. 5B, block 314, line 4, "Set-up" should read --Setup--.

In FIG. 5B, block 442, line 1, "Signalling" should read --Signaling--.

In FIG. 6, "FIG 6" should read --FIG. 6--.

In FIG. 6, block 634, "PDP eg. IP" should read --PDP, e.g., IP--.

In FIG. 8, block 850, "SSGN" should read --SGSN--.

In FIG. 8, on the line connecting blocks 806 and 810, insert --Iub-- and connect a reference number --808-- to --Iub-- with a tag line.

In the Specification:

In column 1, line 36, "CELL DCH:" should read --CELL_DCH:--.

In column 1, line 47, "activity. is" should read --activity is--.

CERTIFICATE OF CORRECTION (continued)
U.S. Pat. No. 7,949,377 B2

In column 1, line 61, "vise-versa" should read --vice versa--.

In column 2, line 19, "implementing-their" should read --implementing their--.

In column 3, line 35, "determines that with" should read --determines with--.

In column 4, line 41, "CELL_FACH 124, state no" should read --CELL_FACH state 124, no--.

In column 5, line 34, "CELL PCH" should read --CELL_PCH--.

In column 5, line 35, "states 126" should read --state 126--.

In column 6, line 20, "idle mode." should read --idle mode 110.--.

In column 7, line 2, "connection 310 setup" should read --connection setup 310--.

In column 7, line 49, "request the that" should read --request that the--.

In column 9, line 31, "signalling" should read --signaling--.

In column 11, line 62, "in addition to!its" should read --in addition to its--.

In column 12, line 25, "however; according" should read --however, according--.

In column 13, line 40, "lub interface" should read --Iub interface--.

In column 13, line 51, "lu-CS" should read --Iu-CS--.

In column 13, lines 57-58, "a MSC" should read --an MSC--.

In column 14, line 12, "lu-PS" should read --Iu-PS--.

In the Claims:

In column 14, line 59, claim 1, "battery demanding" should read --battery-demanding--.

In column 15, line 6, claim 6, "state qr" should read --state or--.

In column 15, line 9, claim 7, "battery demanding" should read --battery-demanding--.

In column 15, lines 10-11, claim 8, "battery demanding" should read --battery-demanding--.

In column 15, line 17, claim 9, "determining and" should read --determining, and--.

In column 15, line 24, claim 11, "claim 1 further" should read --claim 1, further--.

In column 15, line 34, claim 12, "applications each" should read --applications, each--.

In column 15, line 47, claim 12, "battery demanding" should read --battery-demanding--.

In column 16, line 36, claim 21, "battery demanding" should read --battery-demanding--.

In column 17, line 2, claim 23, "battery demanding" should read --battery-demanding--.